(12) United States Patent
Sowa

(10) Patent No.: US 7,194,143 B2
(45) Date of Patent: Mar. 20, 2007

(54) METHOD OF ENHANCEMENT OF THE VISUAL DISPLAY OF IMAGES AND OTHER VISUAL DATA RECORDS

(75) Inventor: Artur Sowa, Durham, NC (US)

(73) Assignee: Pegasus Imaging Corporation, Tampa, FL (US)

( * ) Notice: Subject to any disclaimer, the term of this patent is extended or adjusted under 35 U.S.C. 154(b) by 707 days.

(21) Appl. No.: 10/132,451

(22) Filed: Apr. 26, 2002

(65) Prior Publication Data

US 2003/0202713 A1     Oct. 30, 2003

(51) Int. Cl.
*G06K 9/40*     (2006.01)
(52) U.S. Cl. ....................................... 382/265; 382/262
(58) Field of Classification Search ................ 382/262, 382/251, 267–269, 275, 250, 265
See application file for complete search history.

(56) References Cited

U.S. PATENT DOCUMENTS

| | | | | |
|---|---|---|---|---|
| 4,636,845 | A | * | 1/1987 | Alkofer ....................... 358/522 |
| 5,359,676 | A | * | 10/1994 | Fan ............................ 382/246 |
| 5,495,538 | A | * | 2/1996 | Fan ............................ 382/233 |
| 5,602,934 | A | * | 2/1997 | Li et al. ..................... 382/128 |
| 5,671,013 | A | * | 9/1997 | Nakao ........................ 348/234 |
| 5,768,440 | A | * | 6/1998 | Campanelli et al. ........ 382/261 |
| 5,910,116 | A | * | 6/1999 | Ishii ........................... 600/443 |
| 6,334,001 | B2 | * | 12/2001 | de Queiroz et al. ........ 382/233 |
| 2002/0159648 | A1 | * | 10/2002 | Alderson et al. ........... 382/260 |

OTHER PUBLICATIONS

Jung, Shi Chang, Paik, Joon Ki, Modified Regularized Image Restoration for Postprocessing Inter-Frame Coded Images, 1999, Image Processing, 1999, ICIP 99.*

Jung, Junghoon, Joung, Shichang, Jang, Younhui, Paik, Joonki, Enhancement of Region-of-Interest Coded Images by Using Adaptive Regularization, 2000, Consumer Electronics, 2000, ICCE. 2000 Digest of Technical Papers.*

A. J. Ahumada, Jr., R. Horng, "Smoothing DCT compression artifacts", J. Morreale, ed., Society for Information Display International Symposium V, Digest of Technical Papers, vol. 25, pp. 708-711, 1994.*

Zakhor, A., "Iterative Procedures for Reduction of Blocking Effects in Transform Image Coding", Circuits and Systems for Video Technology, IEEE Transactions on, vol. 2, pp. 91-95, 1992.*

(Continued)

*Primary Examiner*—Matthew C. Bella
*Assistant Examiner*—Sath V. Perungavoor
(74) *Attorney, Agent, or Firm*—Michael P. Straub; Straub & Pokotylo

(57) ABSTRACT

An digital image input, possibly being either pre-compressed or decompressed, is enhanced; its edges are preserved while any compression artifacts, like blocking and ringing, are simultaneously reduced. The enhancement method enhances images with luminance and chrominance functions, incompletely defined or undefined, on a set of pixels so that the missing information is extrapolated while the image is simultaneously enhanced. The method consists of up to three integrated sub-processes: the image sharpening flow; the de-quantization filtering; and the means of control of the local rate of flow. The image sharpening flow is an iterative nonlinear filtering schema intertwining a local median filter and a suitably chosen linear filter. A local geometric control mechanism allows selective application and adaptation of an algorithm allowing selective removal of local artifacts. De-quantization filtering ensures that the enhancement process does not alter information contained in the image beyond its quantization constraints.

37 Claims, 4 Drawing Sheets

OTHER PUBLICATIONS

Bovik, A., "Handbook of Image and Video Processing", Academic Press, pp. 192-198 and 605-606, 2000.*

Jain, A.K., "Fundamentals of Digital Image Processing", Prentice-Hall, pp. 256, 1989.*

Huang, S.J., "Adaptive Noise Reduction and Image Sharpening for Digital Video Compression", Systems, Man, and Cybernetics, 1997. 'Computational Cybernetics and Simulation'., 1997 IEEE International Conference on, vol. 4, pp. 3142-3147, 1997.*

Bouzerdoum, A., "A Combined Quadratic Optimization/Median Filtering Technique for Image Restoration", Systems, Man, and Cybernetics, 1998. 1998 IEEE International Conference on, vol. 5, pp. 4447-4452, 1998.*

Kim, T.K., Paik, J.K., "Blocking Artifacts Reduction Based on Regularize Iterative Image Restoration", Proceedings of ITC-CSCC '98, Jul. 13-15, Sokcho, Korea, pp. 55-58, 1998.*

Coifman, Ronald R. and Artur Sowa. "New Methods of Controlled Total Variation Reduction for Digital Functions." *Society for Industrial and Applied Mathematics*. vol. 39, No. 2, pp. 480-498, 2001.

Frieden, B.R. "A New Restoring Algorithm for the Preferential Enhancement of Edge Gradients." *The Optical Society of America*. vol. 66, No. 3, pp. 280-283, Mar. 1976.

Sowa, Artur. "Novel Types of Nondiffusive Flows with Applications to Image Enhancement." Jan. 2001.

* cited by examiner

METHOD OF ENHANCEMENT OF THE VISUAL DISPLAY OF IMAGES AND OTHER VISUAL DATA RECORDS

BACKGROUND OF THE INVENTION

1. Field of the Invention

The present invention relates generally to signal processing techniques and to image processing in particular. More precisely, the present invention relates to enhancement techniques for sharpening a signal whether or not it contains artifacts resulting from partial loss of information, e.g. through compression, in which case artifacts of compression like blocking and ringing are suppressed simultaneously with sharpening by supplementing or amplifying the high spatial frequencies of an image or, more generally, the high frequency component of any other type of a signal.

2. Discussion of the Related Art

It has been found that, due to the particular properties of the human visual system, perception of spatial image features is improved when the image appears sharper as compared to a blurred image, even if the amount of inherent visual information is the same in both images. A more detailed description of those findings can be found in Anderson, et al., U.S. Pat. No. 6,005,983 and references therein. Motivated by this fact, much effort has been made to provide methods of image sharpening suitable for various applications. Many methods may be successfully applied to enhance images to nearly perfect quality. On the other hand, rapid growth of the amount of digital images stored in the various electronic databases requires images be compressed in order to save memory space. Most compression methods, e.g. those used in the popular JPEG compression software, introduce their own artifacts that diminish the visual quality of stored images by varying degrees depending on the compression rate. However, even minor degradation of image quality may preclude the possibility of sharpening by an ad hoc method, as it would typically result in degrading an image even more. While several techniques of sharpening images and/or other types of signals have been formulated, the sharpening of images in the presence of, say, compression artifacts, e.g. blocking or ringing, has proved elusive. Some partial success in this direction has been achieved in: R. Coifman, A. Sowa, "New methods of controlled total variation reduction for digital functions", SIAM Journal on Numerical Analysis, VOL. 39, NO. 2 (2001), 480–498, which shows how to de-block a JPEG compressed image in such a way that it can be followed by sharpening when the blocking effect is not too strong. The aforementioned method, however, does not allow simultaneous reduction of the ringing artifact and is generally less natural and less successful, although characteristically nonlinear. Another partly successful approach was constructed by B. R. Frieden (B. R. Frieden, "A new algorithm for the preferential enhancement of edge gradients", J. Opt. Soc. Am., 66 (1976), 280–283). This far-seeing approach combined the median and the Fourier filtering techniques in a rather direct way. However, it lacked the correct iterative flow-type formulation, which resulted in losses of the informational content of images. From the point of view of its applicability to tasks that are considered within the present invention, it also lacked other mechanisms of control that would be necessary for the method to be useful in the presence of compression artifacts.

There is a clear reason for that essential lack of previous solutions and the key issue is that most ad hoc engineering solutions rely too heavily, if not solely, on linear methods. Although almost all image enhancement techniques require an application of some mildly nonlinear operations, e.g. application of thresholds, (adaptive) quantization, rescaling in both the physical and the frequency domains, they tend to rely on the various linear, or at least short-time/small-scale linearizable, techniques at their core. Within the linear framework, one achieves sharpening by an application of operators or operations that are unbounded, which means that they will unavoidably result in magnification of discontinuities and errors, e.g. errors of interpolation and/or quantization.

On the other hand, many of the evolutionary nonlinear techniques based on partial-differential-equations techniques also fail when applied to the task at hand. In order to explain what actually happens to an image during the processing, one needs to explain what type of regularity is being restored or imposed on an image during the process. Typically for most methods a function is selected defining the regularity of an image, and then the resulting Euler-Lagrange equation is studied as a basis for constructing the regularizing flow, e.g., an iterative process. The nature of such algorithms is geometric in the sense that the function involves an integral of some function of first order partial derivatives, so that the resulting flow depends on some combination of second order derivatives of the evolving image. Because the flow needs to be defined independently of the choice of coordinates, a schema must be used that diminishes one measure of curvature or another. It should be noted that there can only be a limited number of flows of this type that would be essentially distinct from one another from the viewpoint of their utilization in some engineering task.

SUMMARY OF THE INVENTION

Accordingly, the present invention is directed to a method of enhancement of the visual display of images and other visual data records that substantially obviates one or more of the problems due to limitations and disadvantages of the related art.

An advantage of the present invention is to provide an enhancement process that ensures erasure of a predetermined type of local artifact while simultaneously sharpening a digital image.

Another advantage of the present invention is to provide a set of well-adapted filters and to implement additional enhancement elements of control, e.g. by locally varying rate of flow in an iterative process.

Additional features and advantages of the invention will be set forth in the description which follows, and in part will be apparent from the description, or may be learned by practice, of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a method of enhancing a digital image bearing artifacts of compression relying on the Discrete Cosine Transform (DCT), e.g., JPEG or MPEG, hereinafter described generally as DCT compression, wherein the artifacts comprise at least one of blocking and ringing includes: (a) forming a constraint matrix for a digital image bearing artifacts of DCT compression, the constraint matrix based on at least one of a set of actual parameters of a quantization resulting from the DCT compression of a digital image; and an arbitrary construction suggested by practice; (b) computing transform coefficients of the digital image bearing artifacts by applying a transform to the digital image; (c) applying a first filter to the digital image and forming a first temporary data matrix containing data of the first filtered digital image; (d) filtering the first temporary data matrix with a second filter and forming a second temporary data matrix containing data of the second filtered first temporary matrix; (e) multiplying the second temporary data matrix by a predetermined step size parameter; (f) altering coefficients of the second temporary data matrix having additions to respective transform coefficients of the digital image which violate a predetermined constraint as indicated by a comparison of data at hand with the constraint matrix; (g) adding new coefficients of the second temporary data matrix to corresponding coefficients of the digital image input; (h) inverse-transforming the new coefficients of the matrix resulting from step (g) to form a new enhanced representation of the digital image input; and (i) repeating steps (b)–(h) a predetermined number of times applying these steps each time to the newly enhanced representation of the digital image input, whereby the visual quality of the newly enhanced representation of the digital image is enhanced with respect to the digital image containing artifacts of DCT compression for at least one of display and further electronic processing, wherein the artifacts comprise at least one of a blocking and a ringing.

In another aspect of the present invention, a method of enhancing a digital image consisting of two vision fields in a video system includes: (a) setting a luminance value of every second row of odd or even pixels, of a digital image input, to zero; (b) applying a first filter to the digital image and forming a first temporary data matrix containing the first filtered data; (c) filtering the said first temporary data matrix with a second filter and forming a second temporary data matrix containing a resulting second filtered data; (d) multiplying the second temporary data matrix by a predetermined step-size parameter; (e) adding coefficients of the second temporary data matrix of step (d) to corresponding coefficients within a matrix of the digital image input; (f) iteratively applying steps (b), (c), (d), and (e) a predetermined number of times, thereby forming a newly enhanced representation of the digital image input; and (g) multiplying the newly enhanced representation of the digital image after step (f) by a predetermined number to compensate for a loss of total luminance resulting from the setting performed in step (a), whereby the visual quality of the newly enhanced representation of the digital image input is enhanced with respect to the digital image input for at least one of display and further electronic processing.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, an example of which is illustrated in the accompanying drawings.

A first embodiment of the present invention is directed to the task of restoration of compressed images. While the discussion below is limited to the case of compression with classical DCT, e.g., JPEG or MPEG compression standards, it is understood that any other transforms also used in compression applications, e.g., those related to compression schemas based on Discrete Fourier Transforms, Discrete Wavelet Transforms, and the like, may alternatively be used without departing from the scope of the present invention.

The enhancement process according to the principles of the present invention includes three layers of components that reach to distinct areas of mathematical analysis and provide different engineering level functions. These three layers of essential components comprise:

Layer 1) a filtered-median flow;

Layer 2) functional tools in the form of DCT based filters; and

Layer 3) a set of infinitesimal-scale geometric control mechanisms.

Figure 1:
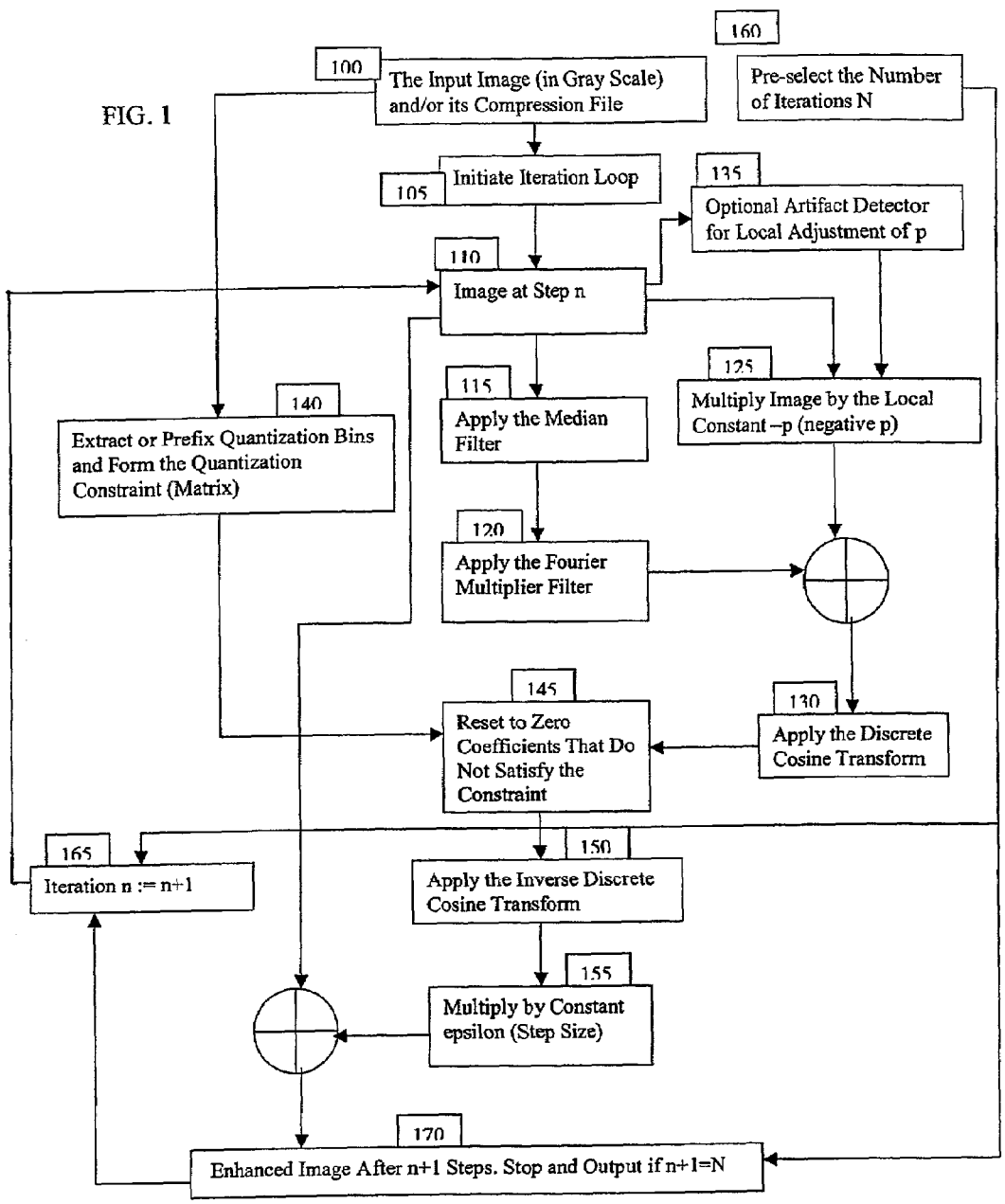
FIG. 1 illustrates a flow chart of a process for enhancement of JPEG compressed images according to the principles of the present invention.

Referring to FIG. 1, a flowchart of an exemplary process for enhancement of JPEG compressed images, according to the principles of the present invention, is illustrated.

Generally referring to FIG. 1, at step 100, an input image and/or its compression file is obtained and entered into an iteration loop 105 of an enhancement process, containing a predetermined number of iterations N (see step 160). Accordingly, image information of the image input at the $n^{th}$ step, where n is an integer from 1, 2, 3, ... N, is filtered using a local median type filter (step 115) and enhanced with a Fourier Multiplier filter (step 120) and then encoded with a Discrete Cosine Transform (step 130).

Additionally, an optional artifact detector of local type (step 135) may be applied to the image information at the $n^{th}$ step to aid in the selective detection of compression artifacts. Application of the optional local artifact detector comprises multiplying a negatived local geometric regularizing factor, p, by the image information at the $n^{th}$ step (step 125). The resulting information, a rescaled copy of the image information at the $n^{th}$ step, is then subtracted from the image information processed after step 120, prior to step 130.

Subsequently, the image information after step 130 is compared to a set of quantization constraints formed from quantization bins made at step 140 or extracted at step 140 from the image information (or its compression file) at step 100. Image information present after step 130 corresponding to the quantization constraints of step 140 is reset to zero if the image information is not within the quantization bins, and is reset to one if the image information is within the quantization bins.

Following the comparison at step 145, the image information is decoded with an Inverse Discrete Cosine Transform (or other suitable inverse compression transform) (step 150) and multiplied by a step size parameter (step 155) determining the degree to which the treatments of steps 115, 120, 125, and 145 alter the image at the $n^{th}$ step. The resulting image information present after step 155 is added to the image information found at step 110 yielding image information of an enhanced image at the end of the $n^{th}$ step (see step 170). By reinserting the enhanced image information at step 170 into the iterative loop at step 110, the iterative process is repeated a predetermined number of times, until n=N (see step 165) and the enhancement process is complete. In one aspect of the invention, N, is determined according to an arbitrary objective or subjective criteria, e.g., contrast ratio, ability to subjectively discern features, etc., applied to the enhanced image at the end of each enhancement iteration.

Despite its apparent complexity, the resulting flow and its properties are mathematically consistent, easily analyzable, and nearly optimal from an engineering perspective. The partitioning of the enhancement process into three morphologically separate and functionally distinct parts makes it easier to describe the flow as well as its variants, applicable to many situations.

An exemplary function of the enhancement process according to the present invention will now be described.

A typical DCT compression algorithm consists of three distinct steps, only two of which are relevant to our discussion. First, a local 8-by-8 Discrete Cosine Transform (DCT) is applied to the digital image input. For the purposes of discussion, a luminance function is denoted by U while the other color features are ignored. Second, the DCT coefficients that cover a connected interval of real numbers are quantized in a quantization operation, Q, so that they may be written into the memory with a smaller number of bits. The quantization operation may itself be adaptive to give subtle variations of the actual quantization bins depending on the compression ratio as well as the frequency content of a particular image on the input. Third, the quantized DCT coefficients are encoded using a lossless coding schema to further reduce the file size of the digital image.

In order to view a compressed image, one has to reverse the procedure described above. Generally, it is impossible to perform a reverse "quantization". However, a reversal in quantization, instead, depends on qualitative features characteristic for a set of compressed images. Accordingly, any procedure applied to compensate for the inability to perform a reverse quantization always contains a voluntary input, reflecting 1) an aesthetic assessment of what qualities in images are most important and need to be emphasized; and 2) a preference and skill in applying a particular set of analytic tools with which to build an appropriate decompression procedure. For example, in building an approximate inverse of Q based on the premise that the DCT coefficients come from a smooth image (in the sense of some measure of its differentiability and continuity), it may be shown that an inverse of Q can be approximated in the sense that U and the reconstructed image would be close. Moreover, the distance (as measured by any reasonable norm) may be controlled by, and estimated in terms of, a relevant measure of smoothness of the input. This works very much like schemas for numerical approximation of consecutive derivatives of a function—the analogy including the fact that both constructions may be justified with a Taylor series approximation. The well known shortcoming of these schemas is that they break down at discontinuities, such as edges, that are natural and ubiquitous features of images. In contrast, algorithms according to the principles of the present invention perform regularization that preserves edges while removing noise and blocking artifacts.

Figure 2A:
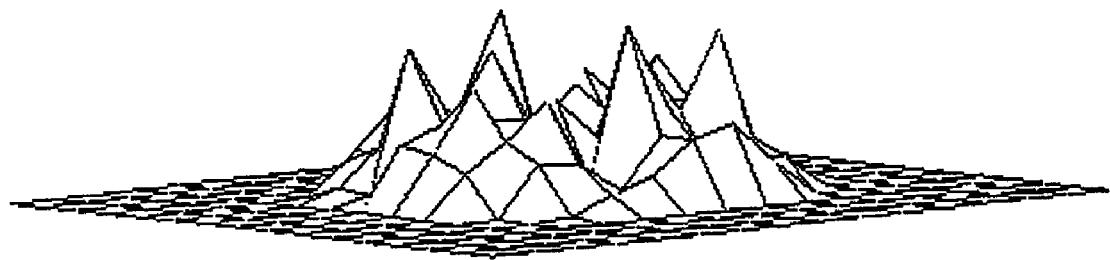
FIGS. 2A–2C illustrate the regularizing effect of an application of processes that are based on the Filtered Median Flow according to the principles of the present invention.
Figure 2B:
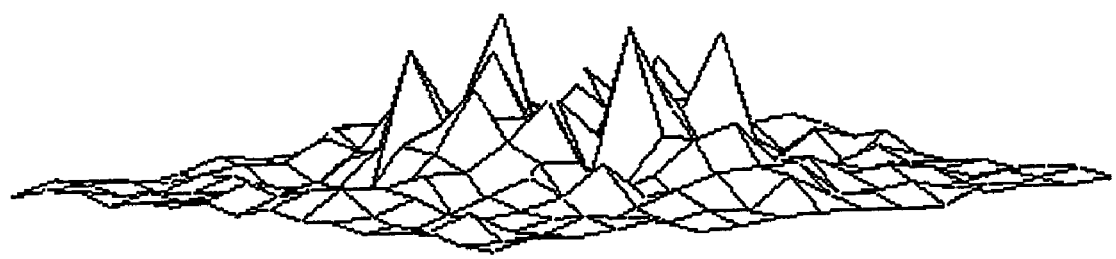
Figure 2C:
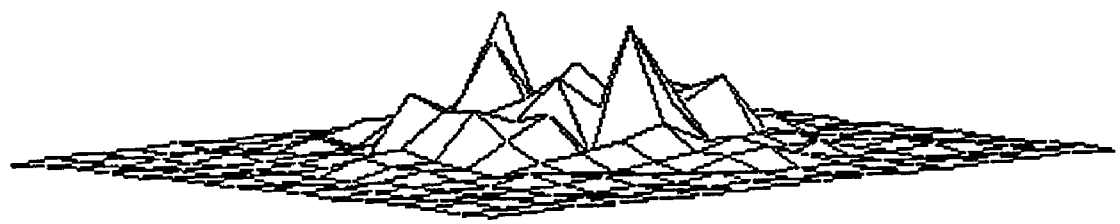

As mentioned above, understanding any method of image processing requires observing what type of regularity it restores or imposes on an image. Accordingly, two observations can be made. First, analysis shows that the notion of regularity cannot be defined in terms of a function dependent on partial derivatives. The notion of regularity according to the principles of the present invention is qualitatively best understood by referring to FIGS. 2A–2C. FIG. 2A depicts frequency characteristics of a random input image in a Fourier Space (FS). FIG. 2B illustrates the frequency characteristics of an output image which has been amplified in the high frequency range. FIG. 2C shows the regularity of the median filtered output. As can be seen, the median filtered output has little energy in the high frequency range. Accordingly, FIGS. 2A–2C show that the present invention causes a median filter of a processed image to concentrate in the low frequency range, while the image itself may contain a large amount of high frequency energy. Thus, the input image is regularized in the coarser scale, as seen via the nonlinear median filter, while actually losing regularity in the finer scale.

The method of the enhancement process according to the principles of the present invention will now be described.

As mentioned above, in order to explain the enhancement method, the three components it comprises are individually discussed. This layered process is conceptual and functional rather than literally present in any of its implementations. In light of the subject matter herein disclosed, it will be clear to persons of ordinary skill in the art what parts of the detailed flow-chart in FIG. 1 belong to what functional layer.

Layer 1—The Driving Force

The filtered-median flow (an iterative process) of the present invention solves extrapolation problems that cannot be sufficiently solved by linear methods and is a basic component of the enhancement process of the present invention.

The luminance functions according to the principles of the present invention are matrices, having components denoted by $U(i,j)$. To simplify notation, it is assumed that a periodic boundary condition exists, so that $U(n+k,n+1)=U(k,l)$. Similarly, all standard functional operators will be interpreted as being periodic, e.g. a convolution with a fixed periodic kernel. The usual Discrete Fourier Transform is heretofore referred to as the Fourier Transform denoted FT and its inverse by IFT. In order to define the flow of the present invention, two operators are needed.

The first of the two operators includes a morphological operator. Accordingly, attention will be focused on the median filter, M as the morphological operator. The median filter is specifically defined as the median of a 3-by-3 rectangular group of pixels omitting the center pixel, where the median is defined as the average of the fourth and fifth largest pixel values. Accordingly, M is subtly nonlinear.

Figure 3A:
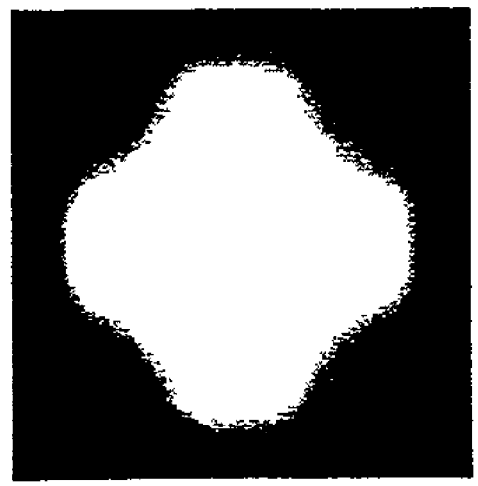
FIGS. 3A–3C illustrate a luminance graph of a filter window used in the process detailed in FIG. 1.
Figure 3B:
Figure 3B:
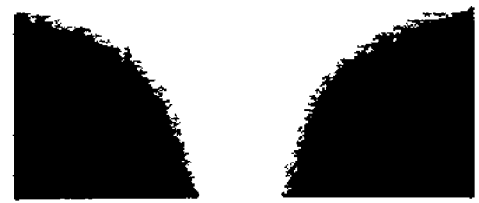
Figure 3C:
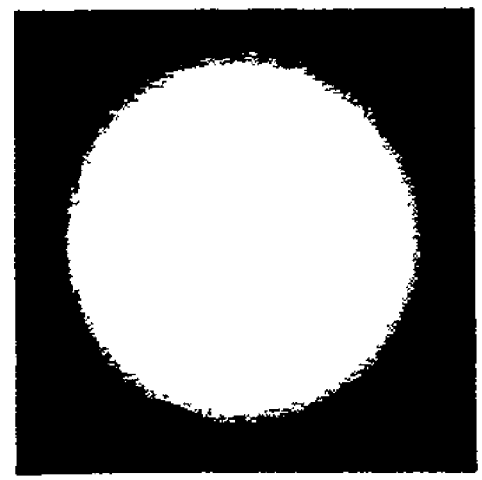

The second of the two operators includes a Fourier band-pass filter or, alternately, a wavelet type filter. Accordingly, let H denote a Fourier multiplier filter having a design based selectively on the structure of the data to be processed. In one aspect of the invention, while referring to FIG. 3A, the Fourier multiplier filter is defined with the shape of a hyperbolic cross, asymptotic to a central cross having a width of 8-by-8 pixels in the frequency space, having a tempered edge falling off according to a sine-squared shape pattern and having a rotationally symmetric cut-off function also with a sine-squared edge fall-off shape. The shape of the window defining the filter shown in FIG. 3A is the product of the windows shown in FIGS. 3B and 3C, where the white area is where the window assumes a value of 1 and the black area is where it vanishes. The fading on the edges of the window corresponds to the windows sine-squared fall off pattern. The sine-squared fall off pattern has the same effect as the well-known Hamming filter. As shown in FIG. 3A, the shape of the window, with some particular choice of parameters, has been found to be best suited for the task of enhancement of DCT compressed images. The Fourier multiplier filtering operation is defined by the equation:

$$H*U=IFT(FT(H)FT(U)).$$

A flow for a particular case when an image is a gray-scale monochromatic image will now be described.

Let U(n) represent luminance of the evolving image after n steps in a flow of an iterative process, with the initial representation U=U(0). An iterative evolution process is defined by the equation:

$$U(n+1)=U(n)+\epsilon H*M(U(n)),$$

where H and M are as specified above and $\epsilon$ represents a typically small step size parameter with effective value between 0 and 1. This is the Filtered Median Flow (FMF).

Alternatively, the FMF may be described as follows: Let f1, f2, . . . , fN denote the orthonormal Fourier basis—for the sake of simplicity we ignore the more natural case of two-dimensional data double indexing. As noted above, the Fourier multiplier filter H acts via multiplication of the Fourier coefficients by fixed numbers—the i-th coefficient gets multiplied by $h_i$. For the type of filters relevant to the present discussion, it is both possible and convenient to fix the indices in such a way that $h_i=0$ for i=1, . . . , k and $0 \leq h_i \leq 1$ for all i=k+1, . . . , n. In this convention, the same flow as above can be written as:

$$U(n+1)=U(n)+\epsilon(\text{sum over all } i\text{'s } (h_i<M(U), f_i>f_i)).$$

This process may also be equivalently rewritten and reprogrammed in a different convention in which the filtering becomes a convolution. The convolution kernel may be oscillatory, when the window is vanishing at the origin of the frequency space. This is one of the characteristic features of the present invention.

It has been shown in A. Sowa, "Novel types of nondiffusive flows with applications to image enhancement", which is incorporated herein by reference, unpublished, that the evolution described above will not blow up to infinity in a finite time. Accordingly, when written into software, the process will never crash.

Depending on the actual initial data, a solution either converges, or diverges to the infinite horizon, or it approaches a cyclic orbit. The solution never exhibits chaotic phenomena. On the other hand, experiment shows that there is always 'convergence' in terms of the optical appearance of solutions.

It should be noted that a generalization to the case of color images based on the gray-scale application may be applied. By running the same process in triplicate, each of the components of the color image corresponds to one of the coordinates of the color vector, independently of whether the image is represented in the red-green-blue or the luminance-chrominance or any other representation.

Layer 2—The Dequantization Filters

In what follows, the Discrete Cosine Transform will be referred to as DCT, and its inverse as IDCT. DCT based filters control the flow and protect the evolved image from undesirable deformation and also from being driven too far away from the original picture. It should be pointed out that the Filtered Median Flow of which Layer 1 consists has been independent of the input image. Layer 2 comprises adaptive tools whose performance is regulated by the input data at the level of a functional transform, e.g. the local DCT transform. More specifically, a control instrument is introduced, ensuring that quantization constraints are not violated during the enhancement process. The relevant quantization constraints are typically extracted from the compression file whenever the file contains this information, and are subsequently transcribed to a format suitable for further processing, as will be described in greater detail below. In the case that quantization constraints are not specified in the compression file, quantization bins may all be set at some arbitrary, experimentally adjusted levels. Historically, it has been easy to find uniform, e.g. frequency independent, quantization levels that guarantee relatively good quality output with usually no more than three to four trials. Once the quantization bins have been set, they are typically universally good for a class of images at hand.

With this understood, the quantization constraint is enforced in the following way: First a matrix, denoted Delta(U(n)) having entries of either 0 or 1, depending on the DCT coefficients of U(n), is prepared. Accordingly, Delta (U(n))(s, f) is 1 if DCT(U(n))(s,f) is within the quantization bin of DCT(U(0))(s,f) while Delta(U(n))(s, f) is 0 otherwise. Next, the information characteristic of the image is encoded using DCT coefficients which are either computed by H*M (U(n)) or are found in and specified by the compression file. The Delta(U(n)) matrix is subsequently used to selectively switch an updating factor DCT(H*M(U(n))) on or off at step n+1, e.g. DCT(H*M(U(n)))(s, f) will be reset to 0 if Delta (U(n))(s, f) is 0.

In concise notation, this leads to the following specification of the original flow:

$$U(n+1)=U(n)+\epsilon IDCT(DCT(H*M(U(n)))\text{Delta}(U(n))).$$

Layer 3—The Local Geometric Control

The process described thus far already may remove a blocking artifact simultaneously while sharpening an image. However, the processes of Layers 1 and 2 do not remove ringing artifacts resulting from the so-called Gibbs phenomena. In order to suppress ringing, an additional mechanism of local geometric control is introduced into the process.

Removal of ringing artifacts may be achieved in the third layer of the process by replacing H*M(U(n)) with H*M(U (n))—pU, where p is a real number between 0 and 1. This leads us to a further extension of the process so that it assumes the form:

$$U(n+1)=U(n)+\epsilon IDCT(DCT(H*M(U(n))-pU(n))\text{Delta} (U(n))).$$

For increasing values of p, increased levels of regularization are observed. Accordingly, at p=1 the output has a silky smooth appearance. Fixing p at, say, p=0.5 provides adequate output for many natural images. However, according to one aspect of the invention, the value of p may depend on the local geometry of the digital image input such that the regularization effect is localized. As an example, one might construct a near-edge detector:

$$0 \leq p=1-Phi(|\text{gradient}(G*U(n))|) \leq 1,$$

where G is the Gaussian kernel in an appropriate scale and Phi is a suitably chosen increasing function which peaks on large values, e.g. steep edges.

An artifact detector may detect whatever form a local artifact has that is preferably erased. Accordingly, the artifact detector includes a detector function which peaks at the location of the artifact. Subsequently, one substitutes the artifact detector function for p in the enhancement method to selectively speed up regularization only at the places where artifacts are detected.

The nonlinear flow described above has a nontrivial enhancement effect on images. Moreover, the nonlinear flow described above, when applied universally, achieves common linear analysis goals as deblocking, interpolation, and focusing simultaneously. The term "universal" is used despite the fact that the process is partly adaptive since information about quantization bins of the input image is used for enhanced results. However, skipping the universal application step would still result in good quality enhancement—yet fully nonadaptive. Alternatively, this type of quantization information is intrinsic to the compressed image and it may, at least in principle, be extracted directly from the data.

The process has been described above in its particular embodiment that may be suitable for enhancement of DCT compressed images. In one aspect of the present invention, the DCT transform may be replaced by another suitable transform, and/or the edge detector may be replaced by another suitable function related to a different type of artifact.

A second embodiment according to the principles of the present invention is directed to enhancing an image having every second row missing or removed. For simplicity, the method is presented below in the gray-scale image version. However, the method may be extended to the enhancement of color images. Accordingly, the same method may be applied to each of the components of any vector representation of such an image. The flowchart for the process of the second embodiment is presented in FIG. 4.

Figure 4:
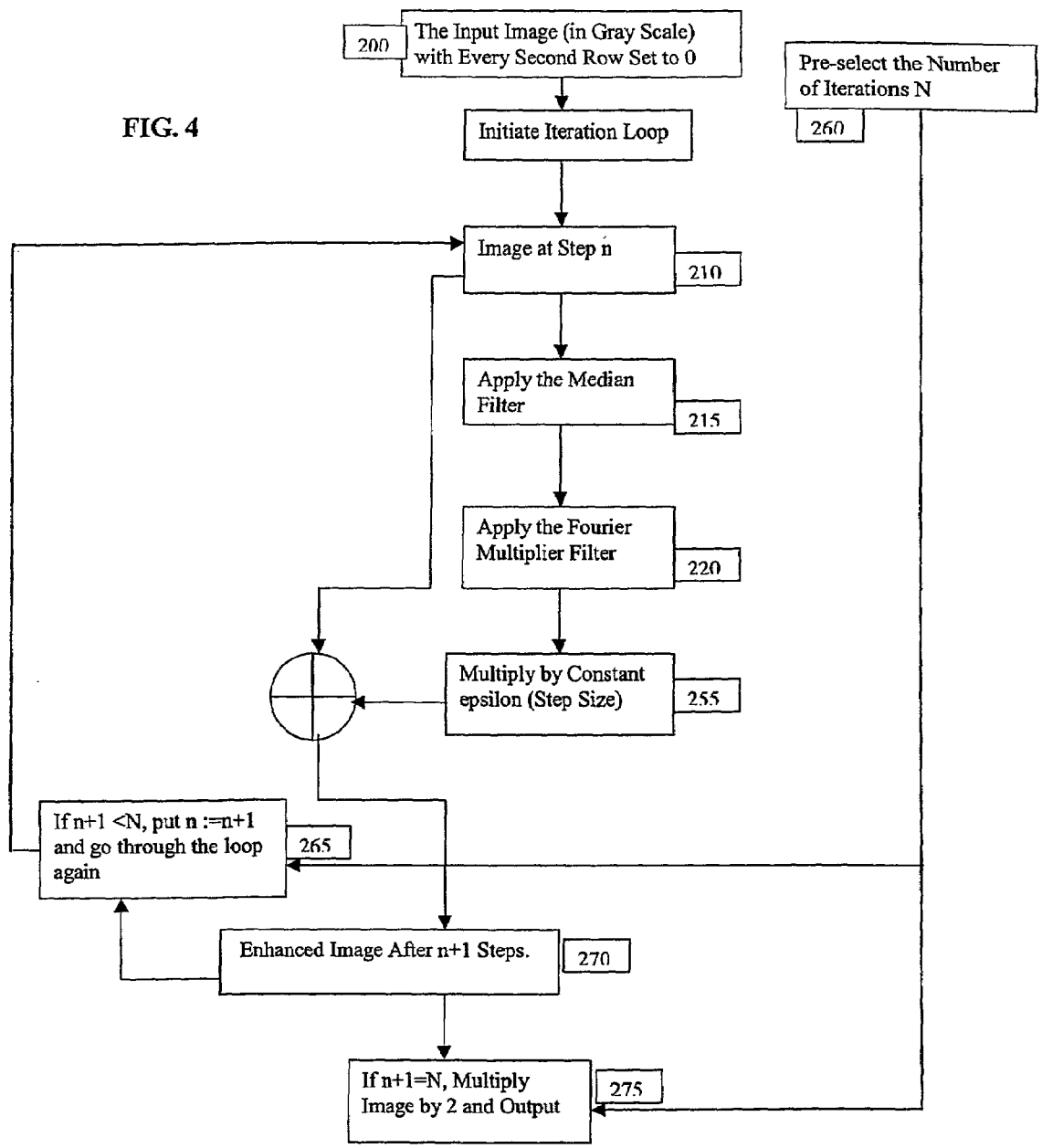
FIG. 4 illustrates a flow chart of a process for enhancement of images whose every second row, e.g. corresponding to a camcorder field, is missing or has been removed.

Generally referring to FIG. 4, at step 200, an input image having every second row set to zero is obtained and entered into an iteration loop 205 of an enhancement process, containing a predetermined number of iterations N (see step 260). Accordingly, image information of the image input at the $n^{th}$ step, where n is an integer from 1, 2, 3, . . . N, is filtered using a local median type filter (step 215) and enhanced with a Fourier Multiplier filter (step 220).

Following the Fourier Multiplier filtering step, the image information is multiplied by a step size parameter (step 255) determining the degree to which the treatments of steps 215 and 220 alter the image at the $n^{th}$ step. The resulting image information present after step 255 is added to the image information found at step 210 yielding image information of an enhanced image at the end of the $n^{th}$ step (see step 270). By reinserting the enhanced image information at step 270 into the iterative loop at step 210, the iterative process is repeated, until n=N (see step 265). When n=N the image information is multiplied by two and the enhancement process is complete. In one aspect of the invention, N is determined according to an arbitrary objective or subjective criteria, e.g., contrast ratio, ability to subjectively discern features, etc., applied to the enhanced image at the end of each enhancement iteration.

The function of the enhancement process will now be described. First, a high pass Fourier multiplier filter is pre-designed and fixed. A filter may be used having a window which assumes the value equal to 1 for high frequencies and assumes the value equal to 0 according to the cosine-squared pattern in a circularly symmetric manner approaching low frequencies. The actual parameters may be experimentally determined. Accordingly, in the one aspect of the present invention, the window defining the filter assumes a value equal to 0 at frequencies less than 60% of a maximal frequency determined by an image size, while the window defining the filter assumes a value equal to 1 at frequencies exceeding 80% of the maximal frequency. This filter may be modified as required by the actual data, e.g. when the data is contaminated with some high frequency noise. Additionally, it is beneficial to use a band-pass filter which suppresses the very high frequencies.

Subsequently, the enhancement method according to the second embodiment comprises all the steps of the enhancement method previously presented in the first embodiment with two exceptions: 1) no quantization constraint is enforced; and 2) the output image obtained in the last step of a predetermined number of iterations is multiplied by a factor of 2.

The multiplication factor of 2 compensates for a loss of luminance energy resulting from every second row of an input image being removed or missing. As the iterative filtering of the image progresses, a luminance function is distributed evenly over initially missing and initially filled rows of pixels, yet the overall sum of luminance from all pixels remains fixed.

The enhancement methods according to the first and second embodiments of the present invention may be used either to implement in stand alone processes or, alternatively, they may be integrated with any other pre-existing image enhancement process. The general enhancement methods may be applied to images at any stage in a broader multi-stage imaging process since the methods do not introduce any undesirable artifacts or distortions by themselves. For example, the general enhancement methods heretofore described may be applied at the very end of a multi-stage imaging process, directly preceding any viewing or printing as a post-processor. Alternately, the general methods heretofore described may be applied at some intermediary step preceding further electronic processing like automatic feature detection or segmenting, or any other automatic manipulation of an image. In addition, the method provided based on the specification provided above may be applied to a broad class of signals with no need to re-adjust any of the parameters to accommodate individual samples of signals. In particular, a process flow set up to handle images having compression artifacts of certain intensity will not degrade the quality thereof and, at the same time, will actually enhance an artifact-free sample. In one aspect of the invention, the principles heretofore described may be implemented and applied to three dimensional data, such as that generated in a CAT scan series.

The conceptual transparency and simplicity of implementation of the methods disclosed here, and their unconditional enhancing effect and adaptability to imaging and signal processing implementations, may be applied to hardware devices, software plug-ins, and toolboxes.

Software plug-ins resulting from a direct implementation of the method according to the first embodiment provide a fast, inexpensive and satisfactory solution to the problem of artifacts present in compressed pictures found on the Internet, whereby those images may be enhanced so as to become more pleasing visually, or may even be magnified or used in further automatic processing. Furthermore, the principles according to the present invention may be applied to videophone technology for the enhancement of still images transmitted in real time, or moving pictures consisting of a sequence of images.

The principles of the present invention may also be applied as a means of enhancing the printing of images which may or may not contain compression artifacts. Various professional applications store large quantities of visual data, forcing the data to be compressed. Whether or not an image has been compressed, sharpening that image prior to printing or photofinishing typically results in high quality prints. When an image includes compression artifacts an application of the present process to an image prior to printing will enhance the copy's quality even if the printing equipment is of finest quality, as the present process will result in partial or even complete erasure of the artifacts. Additionally, the principles of the present invention may be applied to photofinishing processes that may require the conversion of non-digital images into images in a digital format using a medium-specific device, e.g. a scanner. Accordingly, the general methods disclosed herein may be applied to those converted images followed by conversion of the enhanced images from a digital format to any other format useful in photofinishing processes. Accordingly, the process flow, according to the principles of the present invention, may be applied to an image prior to printing and yield a print quality comparable to using relatively more expensive, higher quality printing equipment.

The enhancement method according to the principles of the present invention may be implemented as an automated process having all the relevant parameters fixed at predetermined, universally optimal levels. Alternatively, the enhancement method may be integrated into printer software enabling a user to interactively access and adjust relevant parameters of the enhancement method.

The second embodiment of the present invention may be applied to the display of still images on a screen, e.g., frames from moving pictures of various origin: video, DVD, digital TV, or any other type of video display system. Standard moving picture recording techniques rely on the intertwining of two visual fields. Assumption of this standard is dictated by motion compensation techniques which ensure viewers have an impression of continuity of movement. However, when a video recording depicts fast moving objects, a frozen frame of that video recording yields a blurred, unrealistic, or even illogical depiction of the optical reality as it intertwines essentially time-decorrelated events. This type of task could be successfully performed without any use of the three-dimensional information, e.g. relying solely on the information gathered from the two-dimensional frame at hand. Similar quality enhancement effects may be achieved by a purely two-dimensional approach based on the second method described in detail above. Accordingly, the enhancement method according to the principles of the present invention may be implemented as an automatic process or software plug-in integrated with the television or video equipment.

The enhancement method according to the principles of the present invention process may also be modified in order to guarantee image and/or signal enhancement in medical diagnostics and geological testing equipment in or outside the presence of other, a priori known types of artifacts. Its implementation may either be fully automatic or interactive as outlined above.

Moreover, because the digital image information enhancement according to the methods described above is time based, the scope of the present invention may also extend to the enhancement of one dimensional e.g., digital time-sampled, signals used in electronic measurements of medical diagnostics and geological testing systems. Accordingly, information identifying the digital time-sampled signals may be represented within matrices, as in the case of the digital images, or as vectors of any predetermined dimension.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of enhancing a digital image bearing artifacts of image compression, the artifacts comprising at least one of blocking and ringing, the method comprising:
   (a) forming a constraint matrix for a digital image bearing artifacts of image compression, the constraint matrix based on at least one of:
      a set of actual parameters of a quantization found in a compression file resulting from the image compression of a digital image; and an arbitrary construction suggested by practice;
   (b) encoding information of the digital image bearing artifacts with transform coefficients of the digital image, wherein the encoding is accomplished with a transform;
   (c) applying a first filter to the digital image and forming a first temporary data matrix containing data of the first filtered digital image, the first filter including at least one of a local median filter and a morphological operator different from the local median filter;
   (d) filtering the first temporary data matrix with a second filter to form a second temporary data matrix containing data of the twice filtered first temporary matrix, the second filter including at least one of a Fourier multiplier filter, a convolution filter, and a wavelet filter;
   (e) multiplying the second temporary data matrix by a predetermined step size parameter;
   (f) altering coefficients of the multiplied second temporary data matrix having additions to respective transform coefficients of the digital image which violate a predetermined constraint as indicated by a comparison of known data with the constraint matrix;
   (g) adding altered coefficients of the multiplied second temporary data matrix to corresponding coefficients of the digital image input;
   (h) inverse-transforming the altered coefficients of the matrix resulting from step (g) to form a new enhanced representation of the digital image input; and
   (i) repeating (b)–(h) a predetermined number of times applying these steps each time to the newly enhanced representation of the digital image input,
   whereby the visual quality of the newly enhanced representation of the digital image is enhanced with respect to the digital image containing artifacts of image compression for at least one of display and further electronic processing.

2. The method of enhancing a digital image bearing artifacts of image compression according to claim 1, wherein the transform coefficients of the digital image are computed by applying a transform to the digital image.

3. The method of enhancing a digital image bearing artifacts of image compression according to claim 1, wherein the transform coefficients of the digital image are specified in the compression file.

4. The method of enhancing a digital image bearing artifacts of image compression according to claim 1, wherein the digital image containing artifacts of image compression comprises digital gray scale input.

5. The method of enhancing a digital image bearing artifacts of image compression, according to claim 1, wherein:

the digital image containing artifacts of image compression comprises digital color input, wherein the digital color input comprises vector representation components of at least one of: a characteristic red-green-blue representation and a characteristic chrominance-luminance representation; and separately applying (a)–(i) to each of the vector representation's components of the digital color input.

6. The method of enhancing a digital image bearing artifacts of image compression, according to claim 1, wherein the transform is one of: a Discrete Cosine Transform (DCT), a Discrete Fourier Transform (DFT), and a Discrete Wavelet Transform (DWT).

7. The method of enhancing a digital image bearing artifacts of image compression according to claim 1, further comprising:

after (i), viewing the newly enhanced representation of the digital image on a computer screen.

8. The method of enhancing a digital image bearing artifacts of image compression according to claim 1, further comprising:

after (i), printing the newly enhanced representation of the digital image on a printing device.

9. The method of enhancing a digital image bearing artifacts of image compression according to claim 1, further comprising:

after (i), displaying on a video display device the newly enhanced representation of the digital image as at least one of a still image and a sequence of still images that are part of a motion picture.

10. The method of enhancing a digital image bearing artifacts of image compression according to claim 1, wherein the predetermined number of times is determined according to an arbitrary objective or subjective criteria applied to the enhanced image at the end of each enhancement iteration.

11. The method of enhancing a digital image bearing artifacts of image compression, according to claim 1, wherein:

the first filter includes a local median filter; and
the second filter includes a wavelet filter.

12. A method of enhancing a digital image bearing artifacts of image compression, the artifacts comprising at least one of blocking and ringing, the method comprising:

(a) forming a constraint matrix for a digital image bearing artifacts of image compression, the constraint matrix based on at least one of:
  a set of actual parameters of a quantization found in a compression file resulting from the image compression of a digital image and an arbitrary construction suggested by practice;
(b) encoding information of the digital image bearing artifacts with transform coefficients of the digital image, wherein the encoding is accomplished with a transform;
(c) applying a first filter to the digital image and forming a first temporary data matrix containing data of the first filtered digital image;
(d) filtering the first temporary data matrix with a second filter to form a second temporary data matrix containing data of the twice filtered first temporary matrix;
(e) multiplying the second temporary data matrix by a predetermined step size parameter;
(f) altering coefficients of the multiplied second temporary data matrix having additions to respective transform coefficients of the digital image which violate a predetermined constraint as indicated by a comparison of known data with the constraint matrix;
(g) adding altered coefficients of the multiplied second temporary data matrix to corresponding coefficients of the digital image input;
(h) inverse-transforming the altered coefficients of the matrix resulting from step (g) to form a new enhanced representation of the digital image input; and
(i) repeating (b)–(h) a predetermined number of times applying these steps each time to the newly enhanced representation of the digital image input, whereby the visual quality of the newly enhanced representation of the digital image is enhanced with respect to the digital image containing artifacts of image compression for at least one of display and further electronic processing; and incorporating, at (e), a locally adaptive diffusion process by subtracting from the second temporary data matrix a rescaled copy of the digital image input, wherein the rescaled copy is locally variable with an actual pixel value obtained from a predetermined artifact detector comprising at least one of a near-edge detector and any other artifact detector of local type.

13. A method of enhancing a digital image having at least two vision fields in a video system, the method comprising:

(a) setting the luminance value of every odd or even row of pixels of said digital image input to zero to produce a digital input image;
(b) applying a first filter to the digital input image to form a first temporary data matrix containing the first filtered data, the first filter including at least one of a local median filter and a morphological operator different from the local median filter;
(c) filtering the first temporary data matrix with a second filter to form a second temporary data matrix containing a resulting second filtered data, the second filter including at least one of a Fourier multiplier filter, a convolution filter, and a wavelet filter;
(d) multiplying the second temporary data matrix by a predetermined step-size parameter;
(e) adding coefficients of the multiplied second temporary data matrix of (d) to corresponding coefficients within a matrix of the digital image input to form a new digital input image;
(f) iteratively applying (b), (c), (d), and (e) a predetermined number of times using the new digital input image produced in step (e) as the digital input image of step (b), the new digital input image produced by said iterative processing being a newly enhanced representation of said digital image input; and
(g) multiplying the newly enhanced representation of the digital image after (f) by a predetermined number to compensate for the loss of total luminance resulting from the setting performed in (a).

14. The method of enhancing a digital image having at least two vision fields in a video system according to claim 13, wherein the digital image input comprises digital gray scale input.

15. The method of enhancing a digital image having at least two vision fields in a video system according to claim 13, wherein:

the digital image input comprises digital color input, wherein the digital color input comprises vector representation components of at least one of: a characteristic red-green-blue representation and a characteristic chrominance-luminance representation; and separately applying (a)–(f) to each of the vector representation's components of the digital color input.

16. The method of enhancing a digital image having at least two vision fields in a video system according to claim 13, wherein:
the digital image input comprises an image from a video camera device.

17. The method of enhancing a digital image having at least two vision fields in a video system, according to claim 13, further comprising:
after (g), viewing the newly enhanced representation of the digital image on a computer screen.

18. A method of enhancing a one dimensional digital signal, comprising:
(a) applying a first filter to a one dimensional digital signal and forming a first temporary data vector containing the resulting first filtered data, the first filter includes at least of a local median filter and a morphological operator, different from the local median filter;
(b) further filtering the first temporary data vector with a second filter and forming a second temporary data vector containing a resulting second filtered data, the second filter includes at least one of a Fourier multiplier filter, a convolution filter, and a wavelet filter;
(c) multiplying the second temporary vector by a predetermined step size parameter;
(d) adding the multiplied second temporary vector to a corresponding vector of the one dimensional digital signal; and
(e) iteratively applying (a), (b), (c), and (d) a predetermined number of times, thereby forming a newly enhanced representation of the one dimensional digital signal,
whereby visually and automatically discernible features of the newly enhanced representation of the one dimensional digital signal are enhanced with respect to the one dimensional digital signal for at least one of a display and further electronic processing.

19. A method of enhancing non-digital images, comprising:
(a) converting an image having a non-digital format into a digital image having a digital format;
(b) applying a first filter to the digital image and forming a first temporary data matrix containing the resulting first filtered data, the first filter including at least one of a local median filter and a morphological operator different from the local median filter;
(c) further filtering the first temporary data matrix with a second filter and forming a second temporary data matrix containing a resulting second filtered data, the second filter including at least one of a Fourier multiplier filter, a convolution filter, and a wavelet filter;
(d) multiplying the second temporary matrix by a predetermined step-size parameter;
(e) adding the multiplied second temporary matrix to the corresponding matrix of the image;
(f) iteratively applying (b), (c), (d), and (e) a predetermined number of times, thereby forming a newly enhanced representation of the digital image; and
(g) converting the newly enhanced digital image into a non-digital format.

20. The method of claim 19, wherein:
the first filter includes a morphological operator; and
the second filter includes a Fourier multiplier.

21. The method of claim 19, wherein:
the first filter includes a local median filter and the second filter includes at least one of a Fourier multiplier filter and a wavelet filter.

22. A image enhancement method, comprising:
(a) applying a first filter to the digital image and forming a first temporary data matrix containing the resulting first filtered data, the first filter includes at least one of a local median filter and a morphological operator different from the local median filter;
(b) further filtering the first temporary data matrix with a second filter and forming a second temporary data matrix containing a resulting second filtered data, the second filter includes at least one of a Fourier multiplier filter, a convolution filter, and a wavelet filter;
(c) multiplying the second temporary matrix by a predetermined step-size parameter;
(d) adding the multiplied second temporary matrix to the corresponding matrix of the image;
(e) iteratively applying (b), (c), (d), and (e) a predetermined number of times, thereby forming a newly enhanced representation of the digital image; and 23. The image enhancement method according to claim 22, wherein the number of times is determined according to a subjective criteria applied to the enhanced image at the end of each enhancement iteration; and
wherein the method further includes converting the newly enhanced digital image into a non-digital format.

24. A method of enhancing a three dimensional digital signal, comprising:
(a) applying a first filter to a three dimensional digital signal and forming a first temporary data matrix containing the resulting first filtered data, the first filter includes at least one of a local median filter and a morphological operator, different from the local median filter;
(b) further filtering the first temporary data matrix with a second filter and forming a second temporary data matrix containing a resulting second filtered data, the second filter includes at least one of a Fourier multiplier filter, a convolution filter, and a wavelet filter;
(c) multiplying the second temporary matrix by a predetermined step size parameter;
(d) adding the multiplied second temporary matrix to a corresponding matrix of the three dimensional digital signal; and
(e) iteratively applying (a),(b), (c), and (d) a predetermined number of times, thereby forming a newly enhanced representation of the three dimensional digital signal,
whereby visually and automatically discernible features of the newly enhanced representation of the three dimensional digital signal are enhanced with respect to the three dimensional digital signal for at least one of a display and further electronic processing.

25. A digital enhancement method for reducing the effect of comparison artifacts, the method comprising:
processing a set of input digital data representing one of the image and the digital signal which includes compression artifacts, said set of input digital data including a plurality of data values, said processing including performing a first filtering operation on the data values in said set of input digital data, performing a second filtering operation on a first set of filtered data values produced by said first filtering operation to produce a second set of filtered values, and generating a set of resulting processed values from the second set of filtered data values, each resulting processed value in the set of resulting processed values corresponding to a data value in said set of input digital data, said first filtering operation including applying one of a median filter and a morphological operator to said set of digital input data, said second filtering operation including applying at least one of a Fourier multiplier filter, a convolution filter, and a wavelet filter to the first set of filtered data values;

adding each resulting processed value to the data value in said set of input digital data to which the resulting processed value corresponds to produce a new set of digital data, said new set of digital data representing an enhanced version of said one of said image and said digital signal;

repeating said step of processing said set of input digital data and said adding step with the new set of digital data generated by said adding step being used as said set of input digital data each time said processing step is repeated; and outputting at least one new set of digital data generated by repeating said adding step.

26. The method of claim 25, wherein said processing and adding step are repeated a predetermined number of times.

27. The method of claim 25, further comprising:
applying repeat stop criteria to the new set of digital data to determine if the processing and adding steps should be repeated.

28. The method of claim 25, wherein generating said first set of resulting processed values includes using said second set of filtered data values as said first set of resulting processed values.

29. The method of claim 25, wherein generating said first set of resulting processed values includes:
multiplying the data values in the second set of filtered values by a constant to produce said set of resulting processed values.

30. The method of claim 25, further comprising:
displaying, on a computer screen, an enhanced image generated from the at least one new set of digital data that is output.

31. The method of claim 25, further comprising:
printing, on a printer device, an enhanced image generated from the at least one new set of digital data that is output.

32. The method of claim 25, further comprising:
displaying on a video display device an enhanced image generated from the at least one new set of digital data that is output as an image in a sequence of still images that are part of a motion picture.

33. A method of processing a set of input digital data representing one of an image and a digital signal which includes compression artifacts, said set of input digital data including a plurality of data, the method comprising:

performing a first filtering operation on the data values in said set of input digital data, performing a second filtering operation on a first set of filtered data values produced by said first filtering operation to produce a second set of filtered values;

subtracting a set of rescaled data values from the data values in said second set of data values;

applying a transform to generate a set of transform coefficients;

setting generated transform coefficients to zero which do not satisfy a constraint test to produce an updated set of transform coefficients which include the generated transform coefficients which have not been set to zero and zero values for those discrete cosine transform coefficients which have been set to zero;

applying an inverse transform operation to the updated set of transform coefficients to generate an intermediate set of data values; and multiplying data vales in the intermediate set of data values by a constant to produce a set of resulting processed value, each resulting processed value in the set of resulting processed values corresponding to a data value in said set of input digital data;

adding each resulting proceeded value to the data value in said set of input digital data to which the resulting processed value corresponds to produce a new set of digital data, said new set of digital data representing an enhanced version of said one of said image and said digital signal;

repeating said step of processing said set of input digital data and said adding step with the new set of digital data generated by said adding step being used as said set of input digital data each time said processing step is repeated; and outputting at least one new set of digital data generated by repeating said adding step.

34. The method of claim 33, wherein the transform is one of a Discrete Cosine Transform, a Discrete Fourier Transform and a Discrete Wavelet Transform.

35. The method of claim 33, wherein said transform is a discrete cosine transform and said inverse transform is an inverse discrete cosine transform.

36. The method of claim 33, wherein input data represents a digital image bearing artifacts of image compression, and wherein the set of input digital data includes gray scale values.

37. The method of claim 33, wherein said input data corresponds to a single color component of a color image.

* * * * *